Figure 1:
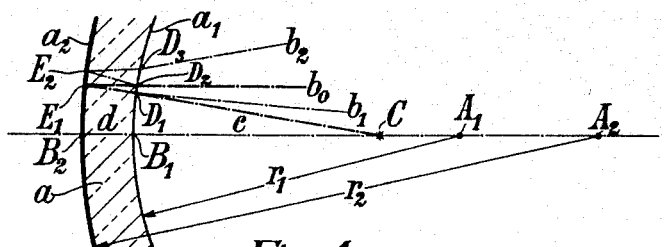

R. STRAUBEL.
REFLECTING SYSTEM.
APPLICATION FILED JAN. 20, 1915.

1,151,975.

Patented Aug. 31, 1915.

UNITED STATES PATENT OFFICE.

RUDOLF STRAUBEL, OF JENA, GERMANY, ASSIGNOR TO THE FIRM OF CARL ZEISS, OF JENA, GERMANY.

REFLECTING SYSTEM.

1,151,975. Specification of Letters Patent. Patented Aug. 31, 1915.

Application filed January 20, 1915. Serial No. 3,377.

*To all whom it may concern:*

Be it known that I, RUDOLF STRAUBEL, a citizen of the German Empire, residing at Jena, Germany, have invented a new and useful Reflecting System, of which the following is a specification.

The present invention relates to reflecting systems, which are intended to unite radiant energy emanating from one point in another point, more particularly with the coöperation of a reflecting surface, which is separated from the medium containing the ray-emitting point by a medium, which has a refractive index differing from that of the medium bounding the said reflecting surface. One of the points can lie at an infinite distance from the reflecting surface and it is immaterial for either point, whether there takes place in it a real or a virtual uniting of the rays. Of the two cases, which are possible with the rays conducted in the manner described, that one is the more frequent, where the emitting point lies in that one of the two mediums, which has the smaller refractive index, that secondary case being again the more frequent, in which the medium containing the emitting point is air, while the other medium is glass. This latter case is the one, which deals with uniting with the aid of a glass reflector, the rear side of which is reflecting (being in certain cases overlaid with metal) rays (*e. g.* light rays or heat rays), which emanate from one point, in another point. In all cases of such a uniting of rays at another point than that, from which they are emitted, a disturbance is occasioned, as is well known, by not only the aforesaid reflecting surface but also the bounding surface of the two media acting in a reflecting manner, that besides the ray system, which follows the desired path (viz. from the point of emission through the bounding surface, where it suffers refraction, to the reflecting surface proper and from this surface back through the bounding surface, again suffering refraction to the uniting point), there are an infinite number of disturbing systems of rays. Of these disturbing systems those are known to be specially noticeable, which are each reflected only once at the bounding surface: the disturbing systems of the first order. If the prejudicial effect of the disturbing systems be met by keeping them away from the point, in which the actual uniting of the rays takes place (the uniting point proper), not only the thorough utilization of the energy transmitted by these rays will be thus sacrificed, but the disturbance will be only imperfectly removed, a diminution, for instance, where it is a question of visible rays, of the contrast of the uniting point proper against its surroundings being the consequence.

The reflecting system according to the present invention is so formed that in the uniting point proper all disturbing systems are united. The result is an almost complete absence of disturbances through undesired reflections and in addition to this a complete utilization of the rays impinging on the reflecting system. It is a condition for the uniting of all disturbing systems in the actual uniting point, that between the radius of curvature $r_1$, which the bounding surface has in its point of intersection with the connecting line of the point of emission and the point of union (*i. e.* in its vertex), the radius of curvature $r_2$, which the reflecting surface has in its point of intersection with the said connecting line, the relative distance $d$ of these two points of intersection, the ratio $n$ of the refractive indices of the two media, the distance $c$ of the point of emission from the vertex of the bounding surface and the distance $c_0$ of the point of union from this vertex there should be strictly or at least approximately the relation $$r_2 = \frac{n^2(r_1+d)^2(c+c_0)^2 - d^2(c-c_0)^2}{n^2(r_1+d)(c+c_0)^2 - d(c-c_0)^2}$$

For a reflecting system of small ratio of aperture the curvature thus determined of both surfaces may also be kept beyond the vertex, both surfaces may therefore be spherical. Such a reflector can be used for instance in daily life as a hand-mirror.

If with reflectors of comparatively large ratio of aperture, the disturbing system, which is reflected only at the bounding surface and hence suffers no refraction, is to unite in the proper uniting point, the condition obtaining for homocentric imaging by pure reflection must be fulfilled, viz. that the bounding surface shall be a surface of revolution, the axis of rotation of which coincides with the line connecting the point of emission with the point of union and the meridian line of which is a conic section, in one of the focal points of which lies the point of emission and in the other focal point the point of union. When the points of emission and union both lie on the same side of the bounding surface, i. e., if both points be real or both virtual, and when both points lie at a finite distance from the reflecting surface the bounding surface must be an ellipsoid of revolution; this surface will be, when both points are real, the inner one, in the other case it will be the outer one. When the points of emission and union lie on different sides of the bounding surface, i. e., if one of the two points is real and the other virtual, and when both points lie at a finite distance from the reflecting surface the bounding surface must be a hyperboloid of revolution; this surface will be, when the real point lies in its focal point, the inner one; it will be the outer one, when the virtual point lies in its focal point. When the point of emission or the point of union lies at an infinite distance, the bounding surface must be a paraboloid of revolution and is, when that one of the two points, which lies at a finite distance, is real, the inner one, when the said point is virtual, the outer one.

Even for comparatively large angles of aperture at the point of union of the rays, which are reflected only at the bounding surface, an almost perfect union of the other disturbing systems and the ray system proper also takes place, when the reflecting surface (correctly curved at its vertex) is a corresponding surface of revolution of the second degree, the axis of rotation of which coincides with the axis of the bounding surface and the meridian line of which is a conic section, the center of which coincides with that of the bounding surface (when each of the surfaces is a paraboloid, both centers lie at an infinite distance).

Should it be desired to obtain for angles of aperture of any size a strict union in one single point of all rays, the reflecting surface (correctly curved at its vertex) must deviate from the just described surface of the second degree and should be so formed that all rays reflected only at it unite in one point. This point is then the point of union of all disturbing systems and coincides with the point of union of the rays, which are reflected at the bounding surface only, as the reflecting system, because the reflecting surface is curved at its vertex in conformity with the above mentioned condition, unites the rays, which are reflected at the vertex of the reflecting surface only, in the point of union of the rays, which are reflected at the bounding surface only. The simplest mode of procedure in this case, when ascertaining the form of the reflecting surface or when manufacturing the same, is to start from the described surface of the second degree and to transform this approximation to the surface by calculation or by experiment in the well known manner zone for zone into the desired surface.

Figure 2:
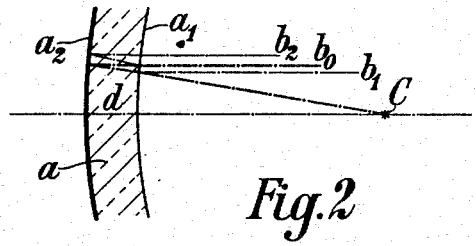
Figure 3:
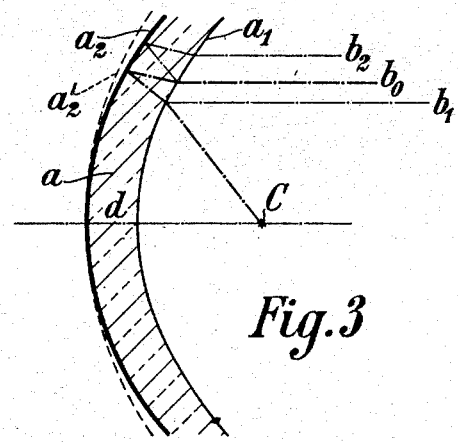
Figure 4:
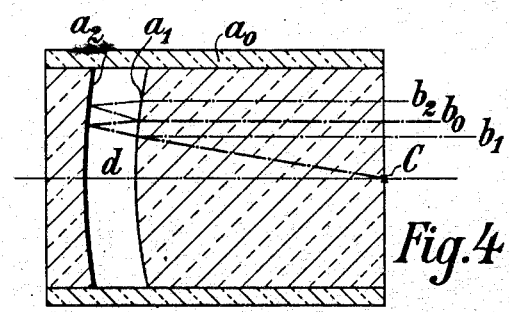

In Figure 1 of the annexed drawing a reflector which does not correspond to the invention, is shown in a meridian-section, Figs. 2, 3, 4 show as examples each a meridian-section through a reflector according to the invention. In all these examples it is supposed that the one of the two points lies at an infinite distance.

Fig. 1 illustrates the formation of the disturbing systems of rays. A glass reflector $a$ is bounded by two spherical segments, of which the inner $a_1$ has its center in the point $A_1$, the outer $a_2$ its center in the point $A_2$. The radius of the sphere $a_1$ is equal $r_1$, that of the sphere $a_2$ is equal $r_2$. The straight line connecting the points $A_1$ and $A_2$ forms the axis of the reflector. It strikes the spherical surface $a_1$ in the point $B_1$, the spherical surface $a_2$ in the point $B_2$. The spherical surface $a_2$ is silvered, it is the reflecting surface. The surface $a_1$ is the bounding surface. The point $B_1$ is the vertex of the bounding surface, the point $B_2$ is the vertex of the reflecting surface. The distance of the points $B_1$ and $B_2$ from each other is the thickness of vertex $d$ of the reflector. Suppose a ray emanating from a point C of the axis, the distance of C from $B_1$ being equal to $c$, strikes the surface $a_2$ in the point $D_1$. The ray then suffers a small refraction in entering the body of the reflector and strikes the surface $a_2$ in the point $E_1$. There it is reflected, strikes the surface $a_1$ in the point $D_2$, suffers a small refraction in leaving the body of the reflector and continues as ray $b_0$ parallel to the axis of the reflector. In striking the point $D_1$ of the surface $a_1$ a part of the ray did not enter the body of the reflector, but was reflected at the surface $a_1$. This partial ray belongs to one of the two disturbing systems of the first order and continues as ray $b_1$ convergent as regards to the axis. In striking the point $D_2$ of the surface $a_1$, a part of the proper ray did not leave the body of the reflector, but was reflected at this surface and struck the surface $a_2$ in the point $E_2$. There it was again reflected, struck the surface $a_1$ in the point $D_3$ and in leaving the body of the reflector suffered a small refraction. This partial ray belongs to the other of the two disturbing systems of the first order and continues as partial ray $b_2$ divergent as regards to the axis. From the disturbing systems of the first order separate those of the second order accordingly and so on. While to the system of rays proper, containing all rays $b_0$, belongs a point of union, the distance of which $C_*$ from the point $B_1$ is infinite, there belongs to the disturbing system, containing all rays $b_1$, a real point of union, lying at a finite distance in front of the reflector, and to the disturbing system containing all rays $b_2$ there belongs a virtual point of union lying at a finite distance behind the reflector.

Fig. 2 shows a glass reflector bounded by two spherical segments, the radii of curvature of the reflector corresponding to the above mentioned relation. Here an infinite point of union belongs to the system proper and to the disturbing systems.

Fig. 3 shows a reflector, the inner surface $a_1$ of which is the surface of a paraboloid with the axis of the reflector as axis of rotation. The outer surface $a_2$ differs from the surface $a'_2$ of a paraboloid (shown lineated in the drawing) of which the radius of curvature in the vertex is deducted by means of the above mentioned relation from the radius of curvature in the vertex of the inner surface and the thickness of vertex of the reflector, in so far as is necessary to free the reflector in its entire course from the disturbances described.

In the reflector, shown in Fig. 4, the medium bounding the reflecting surface is air and the medium between the bounding surface and the point emanating the rays is glass. The two glass bodies, containing the surfaces $a_1$ and $a_2$, are connected with each other by a hollow glass cylinder $a_0$. As to the rest this example corresponds to the one shown in Fig. 2. Such an appliance may serve as magnifier for viewing a small object, which is pressed in point C against the glass body containing the surface $a_1$.

I claim:

1. In a reflecting system intended for uniting rays emanating from one point in another point by reflection a reflecting surface, a medium, the refractive index of which differs from that of the medium in which the point emitting the rays lies, and a bounding surface separating the two media from one another, between the radius of curvature $r_1$, which the bounding surface has in its point of intersection with the connecting line of the point of emission and the point of union (in its vertex), the radius of curvature $r_2$, which the reflecting surface has in its point of intersection with the said connecting line, the relative distance $d$ of these two points of intersection, the ratio $n$ of the refractive indices of the two media, the distance $c$ of the point of emission from the vertex of the bounding surface, and the distance $c_0$ of the point of union from this vertex being at least approximately the relation $$r_2 = \frac{n^2(r_1+d)^2(c+c_0)^2 - d^2(c-c_0)^2}{n^2(r_1+d)(c+c_0)^2 - d(c-c_0)^2}$$

2. In a reflecting system intended for uniting rays emanating from one point in another point by reflection a reflecting surface, a medium, the refractive index of which differs from that of the medium, in which the point emitting the rays lies, and a bounding surface separating the two media from one another, between the radius of curvature $r_1$, which the bounding surface has in its point of intersection with the connecting line of the point of emission and the point of union (in its vertex), the radius of curvature $r_2$, which the reflecting surface has in its point of intersection with the said connecting line, the relative distance $d$ of these two points of intersection, the ratio $n$ of the refractive indices of the two media, the distance $c$ of the point of emission from the vertex of the bounding surface and the distance $c_0$ of the point of union from this vertex being at least approximately the relation $$r_2 = \frac{n^2(r_1+d)^2(c+c_0)^2 - d^2(c-c_0)^2}{n^2(r_1+d)(c+c_0)^2 - d(c-c_0)^2}$$

and the reflecting surface and the bounding surface being surfaces of revolution with the said connecting line as axis of rotation and each with a conic section as line of meridian, the great axis of which coincides with the axis of rotation, whereby the point of emission and the point of union lie each in a focal point of the bounding surface and whereby the center of the reflecting surface coincides with that of the bounding surface.

3. In a reflecting system intended for uniting rays emanating from one point in another point by reflection a reflecting surface, a medium, the refractive index of which differs from that of the medium, in which the point emitting the rays lies, and a bounding surface separating the two media from one another, between the radius of curvature $r_1$, which the bounding surface has in its point of intersection with the connecting line of the point of emission and the point of union (in its vertex), the radius of curvature $r_2$, which the reflecting surface has in its point of intersection with the said connecting line, the relative distance $d$ of these two points of intersection, the ratio $n$ of the refractive indices of the two media, the distance $c$ of the point of emission from the vertex of the bounding surface and the distance $c_0$ of the point of union from this vertex being at least approximately the relation $$r_2 = \frac{n^2(r_1+d)^2(c+c_0)^2 - d^2(c-c_0)^2}{n^2(r_1+d)(c+c_0)^2 - d(c-c_0)^2}$$

and the reflecting surface and the bounding surface being surfaces of revolution with the said connecting line as axis of rotation, the bounding surface with a conic section as line of meridian, the great axis of which coincides with the axis of rotation and in the one focal point of which lies the point of emission and in the other focal point of which lies the point of union, while the reflecting surface is so formed that the rays emanating from the one focal point of the reflecting surface and reflected only at the reflecting surface unite in one point.

RUDOLF STRAUBEL.

Witnesses:
 PAUL KRÜGER,
 RICHARD HAKER.